Aug. 2, 1932.   R. G. CALTON   1,870,173
METAL FURNITURE FASTENING
Filed March 9, 1931

INVENTOR
R. G. Calton

BY
*Sigges & Adams*
ATTORNEYS

Patented Aug. 2, 1932

1,870,173

UNITED STATES PATENT OFFICE

ROBERT G. CALTON, OF NASHVILLE, TENNESSEE, ASSIGNOR TO TENNESSEE ENAMEL MANUFACTURING CO., A CORPORATION OF TENNESSEE

METAL FURNITURE FASTENING

Application filed March 9, 1931. Serial No. 521,354.

This invention relates to metal furniture fastenings and, among other objects, aims to provide an improved joint between sheet metal legs or uprights and supporting frame members. The main idea is to provide a strong, relatively simple and efficient joint connection, including novel clamping members or clips for securing the parts together and holding them assembled.

Other aims and advantages of the invention will appear in the specification, when considered in connection with the accompanying drawing, wherein:—

Figure 1:
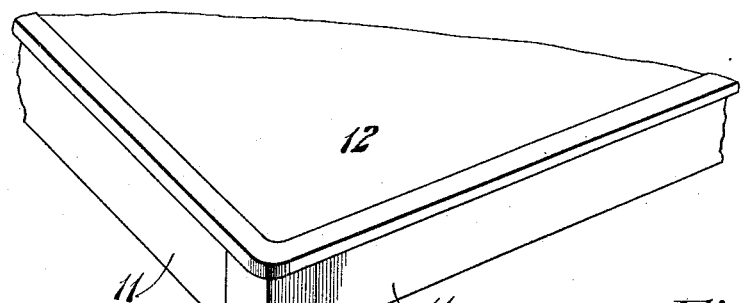
Fig. 1 is a fragmentary perspective view of a metal table embodying the invention.
Figure 2:
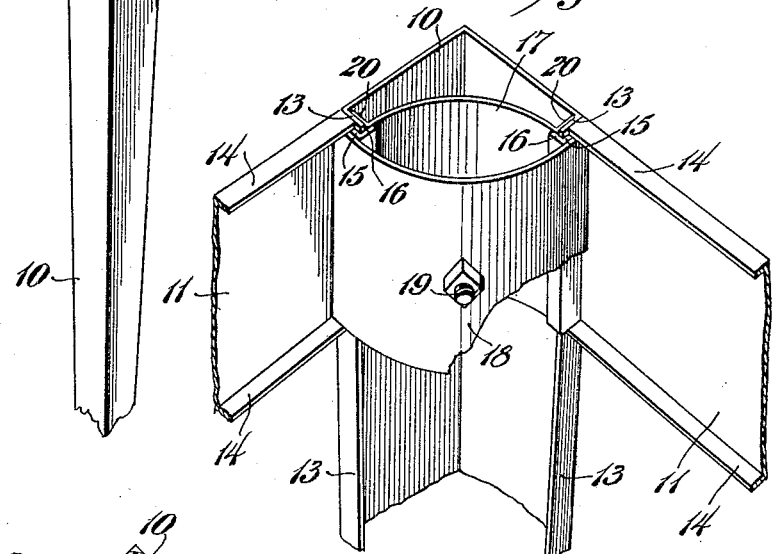
Fig. 2 is a fragmentary perspective view, on an enlarged scale, showing the preferred form of leg joint.

Referring particularly to the drawing, the illustrated form of fastening is shown as being applied to a sheet metal table for securing the legs 10 to the table base or apron frame members 11 on which an ordinary table top 12 is secured.

Figure 3:
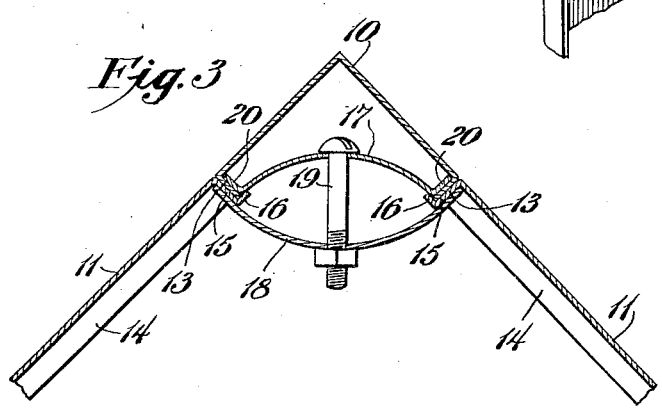
Fig. 3 is a horizontal sectional view of the leg joint shown in Fig. 2.

In this example, the legs are stamped out of sheet metal to form angles having narrow strengthening flanges 13 bent inwardly at their edges so as to present a smooth appearance. The base members 11 are conveniently channel-shaped, having narrow flanges 14 and the ends of the webs are preferably bent, as shown in Fig. 3, to provide inwardly extending flanges 15 and narrow, angle flanges 16 at their ends to form seats for the edge flanges 13 of the legs. The arrangement is such that the legs are flush with the outer faces of the channel webs when the parts are seated as shown.

In accordance with this invention, the leg flanges 13 are clamped against the web flanges 15 by means of a pair of sheet metal clamps or arcuate clips 17 and 18 and a clamping bolt 19. The clamp 17 is shown as having flanges 20 at its ends to lie flat against the flanges 13 on the leg between the edges of the stop flanges 16 and the inner walls of the leg. This clamp member, after the bolt has been inserted, can be slipped into the top of the leg. The inner clamp 18 is curved or bowed inwardly and its end edges are seated against the inner faces of the web flanges 13. As clamping pressure is applied by means of the nut, the bowed clamps resist bending and exert clamping pressure against the leg and web flanges throughout the width of the webs. If desired, the clamps may be further strengthened or reinforced by means of stamped-out, longitudinal ribs.

From the foregoing description, it will be seen that all of the parts may be manufactured very cheaply by cutting, stamping and/or bending operations. There are no bolted or welded parts on the legs. The legs and the clamps can be nested together for shipping and the parts are very easy to assemble or dismantle. There are no exposed bolts or slots in the legs to mar the appearance.

Obviously, the present invention is not restricted to the particular embodiment thereof herein shown and described.

What I claim is:—

1. Joints and fastenings for metal furniture comprising horizontal, channel-shaped sheet metal members having inwardly bent webs at their ends to provide seats; sheet metal legs having flanges bent to engage said seats; and pairs of separate, sheet metal clamping members to clamp the legs in said seats and hold the parts assembled.

2. Joints and fastenings for metal furniture comprising, in combination, horizontal frame members having their ends bent to provide flanged seats; supports fitting in said seats having flanges abutting the flanges of the seats; and pairs of bent, sheet metal clips for clamping said abutting flanges together.

3. In a metal table of the class described, base frame members having inwardly bent flanges at their ends; angular sheet metal legs having flanges abutting the flanges on the base frame members; pairs of sheet metal clips engaging the opposed faces of the abutting flanges; and a bolt through each pair of clips to clamp the flanges together.

4. In a metal table of the class described, apron frame members; sheet metal legs having marginal flanges seated against the ends of the frame members; a pair of sheet metal, arcuate clips for clamping each leg to the frame members; and clamping bolts for said clips.

5. In a metal table of the character described, side frame members having inwardly extending flanges; a sheet metal leg having flanges seated against the flanges on the side frame members; a pair of oppositely bowed sheet metal clamping members engaging the abutting flanges; and a single clamping bolt passing through the bowed portions of said members.

6. In a metal table of the character described, side frame members having inwardly extending flanges; a sheet metal leg having flanges seated against the flanges on the side frame members; a metal clamp comprising a pair of opposed, arcuate, sheet metal clips having end portions bent substantially parallel with each other to engage the opposite sides of the contacting flanges; and a clamping bolt passing substantially centrally through said clips.

In testimony that I claim the foregoing as my own, I have hereto affixed my signature.

ROBERT G. CALTON.